United States Patent [19]
Allen et al.

[11] Patent Number: 5,471,147
[45] Date of Patent: Nov. 28, 1995

[54] APPARATUS AND METHOD FOR DETERMINING THE LINEAR POSITION OF A HYDRAULIC CYLINDER

[75] Inventors: William E. Allen; Ali A. Bitar, both of Peoria; Robert A. Herold, Peoria Heights, all of Ill.

[73] Assignee: Caterpillar Inc., Peoria, Ill.

[21] Appl. No.: 30,184

[22] PCT Filed: Oct. 3, 1991

[86] PCT No.: PCT/US91/07313

§ 371 Date: Oct. 3, 1991

§ 102(e) Date: Oct. 3, 1991

[87] PCT Pub. No.: WO93/07444

PCT Pub. Date: Apr. 15, 1993

[51] Int. Cl.⁶ .................................. G01R 27/04
[52] U.S. Cl. ................ 324/635; 324/636; 324/644; 73/579
[58] Field of Search ............... 73/641, 579, 586; 324/635, 636, 644; 340/870.35; 364/561

[56] References Cited

U.S. PATENT DOCUMENTS 3,514,703  5/1970  Soga ........................... 324/636
3,522,527  8/1970  Williams ...................... 324/636
3,737,770  6/1973  Masson ........................ 324/636
4,364,046  12/1982 Ogasawara .................... 73/579
5,351,541  10/1994 Petrovich ..................... 324/636

FOREIGN PATENT DOCUMENTS

0758006  8/1980  U.S.S.R. ..................... 324/635

Primary Examiner—Kenneth A. Wieder
Assistant Examiner—Jose M. Solis
Attorney, Agent, or Firm—James R. Yee

[57] ABSTRACT

An apparatus (102) and method for detecting the position of a piston and piston rod (104,106) within a housing (108) of a hydraulic cylinder (110). The piston (104), piston rod (106), and housing (108) form first and second coaxial resonant cavities (114,116). A first location of the piston and piston rod (104,106) is determined as a function of the resonant frequency of one of the coaxial cavities (114,116). A second location of the piston and piston rod (104,106) is determined as function of the resonant frequency of the other cavity if the first location is invalid.

15 Claims, 8 Drawing Sheets

Fig_1_

Fig_2_

Fig-4

Fig_5_

Fig_6_

Fig_7_

Fig_8_

Fig_10_

5,471,147

APPARATUS AND METHOD FOR DETERMINING THE LINEAR POSITION OF A HYDRAULIC CYLINDER

TECHNICAL FIELD

This invention relates generally to an apparatus and method for determining the position of a piston and piston rod within a housing of a hydraulic steering cylinder and, more particularly, to an apparatus and method for determining the position of the piston and piston rod over the full extension range of the cylinder.

BACKGROUND ART

In the field of hydraulic cylinders, a variety of systems have been proposed in which the displacement of the elements of the cylinder is electrically sensed and displayed or used to perform control functions. Conventional transducers have serious deficiencies owing in part to difficulties in mounting the units and the harsh environmental conditions to which they are exposed. Transducers used on hydraulic systems in the heavy equipment industry are particularly subject to damage from the severe work environment. Hydraulic cylinders are typically located in relatively unprotected areas and are typically subject to, for example, high g-forces, wide temperature variations, dust, water, debris, etc. which can result in both electrical and mechanical failure.

One attempt to provide a sensor which is particularly suitable for the heavy equipment industry uses radio frequency (RF) signals. One such system is disclosed in U.S. Pat. No. 4,737,705 issued Apr. 12, 1988 to Bitar, et al. Bitar transmits a ramping RF signal into a coaxial resonant cavity formed by the hydraulic cylinder. When the cylinder's resonant frequency is transmitted, the signal detected by a receiving antenna reaches a peak. The resonant frequency has a one to one relationship with the cylinder's extension. Thus, by determining the cylinder's resonant frequency, the cylinder's linear extension can be determined.

However, a hydraulic cylinder is almost never a perfect geometric shape (for example, a perfect cylinder.) This may result in portions of the linear extension of the cylinder where the position is inaccurate or totally unreadable. Such portions are called deadband.

For example, in Bitar, a pair of antennas are located at one end of the coaxial resonant cavity. There is a portion (deadband), starting from the antennas and extending out into the cylinder for which the position cannot be determined. The length of the deadband portion varies from cylinder to cylinder.

In many applications, this deadband portion is not critical either because for the given application the cylinder does not extend into the deadband portion or the accuracy is not needed. However, in some applications cylinder extension is needed for the full length of the cylinder.

The present invention is directed at overcoming one or more of the problems as set forth above.

DISCLOSURE OF THE INVENTION

In one aspect of the present invention, an apparatus for detecting a linear position of a piston and a piston rod is provided. The piston and piston rod are movable within a housing and form first and second coaxial resonant cavities. The apparatus includes RF sections for determining the resonant frequencies of the cavities and a sensor controller for determining the position of the piston and piston rod.

In another aspect of the invention, a method for detecting a linear position of a piston and a piston rod is provided. The piston and piston rod are movable within a housing and define first and second coaxial resonant cavities. The method includes the steps of determining the resonant frequency of one of the cavities and responsively determining a first location of the piston. If the first location is invalid then the resonant frequency of the other cavity is determined and a second location is responsively determined.

BEST MODE FOR CARRYING OUT THE INVENTION

With reference to the drawings, the RF system 102 is adapted to determine the position of a hydraulic cylinder over the full range of its extension.

Figure 1:
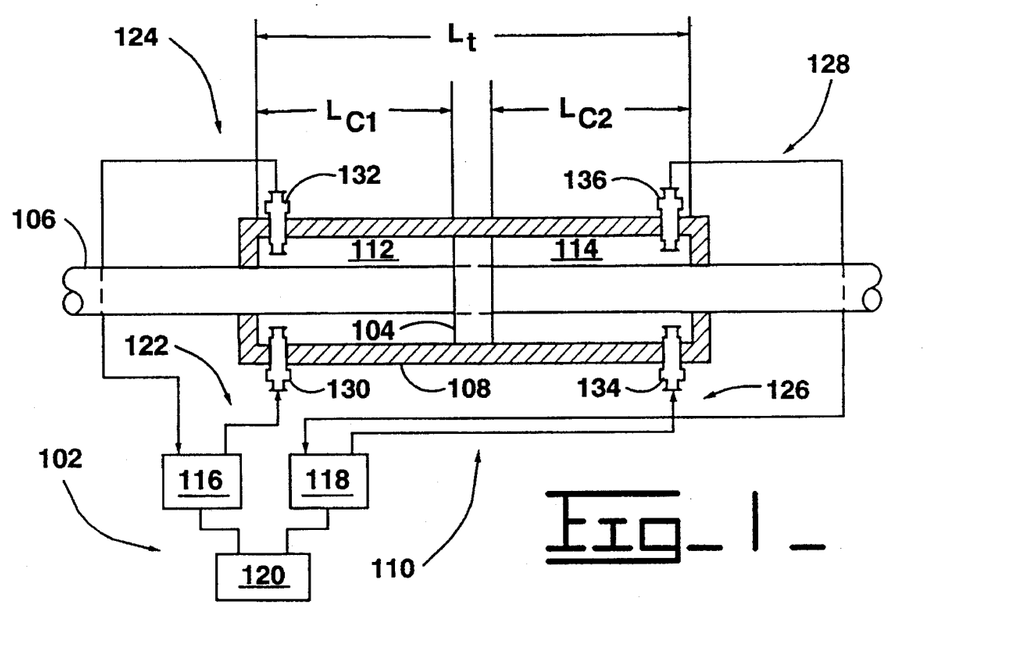
FIG. 1 illustrates a block diagram of an radio frequency (RF) linear sensor for a steering cylinder, according to one embodiment of the present invention.

As shown in the stylized representation of a steering hydraulic cylinder 110, the cylinder 110 includes a piston 104 and piston rod 106 and a housing 108. The piston rod 106 extends through both sides of the cylinder 110 and is movable between two endpoints. The piston 104 is substantially centered on the piston rod 106. The total length of the piston's movement is designated as $L_T$.

First and second variable length coaxial cavities 112,114 are formed by the housing 108, the piston 104 and each end of the piston rod 106, respectively. The length of the first and second variable length coaxial cavities 112,114 are designated $L_{C1}$ and $L_{C2}$, respectively. The total length, $L_T$, is equal to $L_{C1}$ plus $L_{C2}$ plus the width of the piston 104.

In the preferred embodiment, the system 102 is adapted to detect the position of the piston 104 within a steering cylinder. However, the present invention can be adapted to other cylinders with two coaxial cavities.

A means 116 determines the resonant frequency of the first coaxial cavity 112 and responsively produces a first resonant frequency signal.

A means 118 determines the resonant frequency of the second coaxial cavity 112 and responsively produces a second resonant frequency signal.

A means or sensor controller 120 receives the first and second resonant frequency signals and determines first and second locations of the piston 104 and piston rod 106 as a function of the first and second frequency signals, respectively, and compares the first and second locations with a predetermined setpoint and responsively determines the position of the piston 104 and piston rod 106.

The first coaxial cavity resonant frequency determining means 116 includes a means 122 for producing a first electromagnetically radiated signal and delivering the first electromagnetically radiated signal into the first resonant cavity 112. The electromagnetically radiated signal has a frequency varying between predetermined minimum and maximum values. The first electromagnetically radiated signal producing means includes a first transmitting antenna 130.

The first coaxial cavity resonant frequency determining means 116 also includes a first means 124 for sensing an electromagnetic wave signal within the first coaxial cavity 112, comparing the first electromagnetic wave signal with a first predetermined threshold and producing a first frequency signal in response to the magnitude of the first electromagnetically radiated signal being greater than the first predetermined threshold. The first electromagnetic wave signal sensing means 124 includes a first receiving antenna 132.

The second coaxial cavity resonant frequency determining means 118 includes a means 126 for producing a second electromagnetically radiated signal and delivering the second electromagnetically radiated signal into the second resonant cavity 114. The electromagnetically radiated signal has a frequency varying between predetermined minimum and maximum values. The second electromagnetically radiated signal producing means 126 includes a second transmitting antenna 134.

The second coaxial cavity resonant frequency determining means 118 also includes a second means 128 for sensing an electromagnetic wave signal within the second coaxial cavity 114, comparing the second electromagnetic wave signal with a second predetermined threshold and producing a second frequency signal in response to the magnitude of the second electromagnetically radiated signal being greater than the second predetermined threshold. The second electromagnetic wave signal sensing means 124 includes a second receiving antenna 136.

In one embodiment, the first and second electromagnetically radiated signal producing means 122,126 and the first and second electromagnetic wave sensing means 124,128 includes separate radio frequency (RF) transmitters and receivers.

Figure 2:
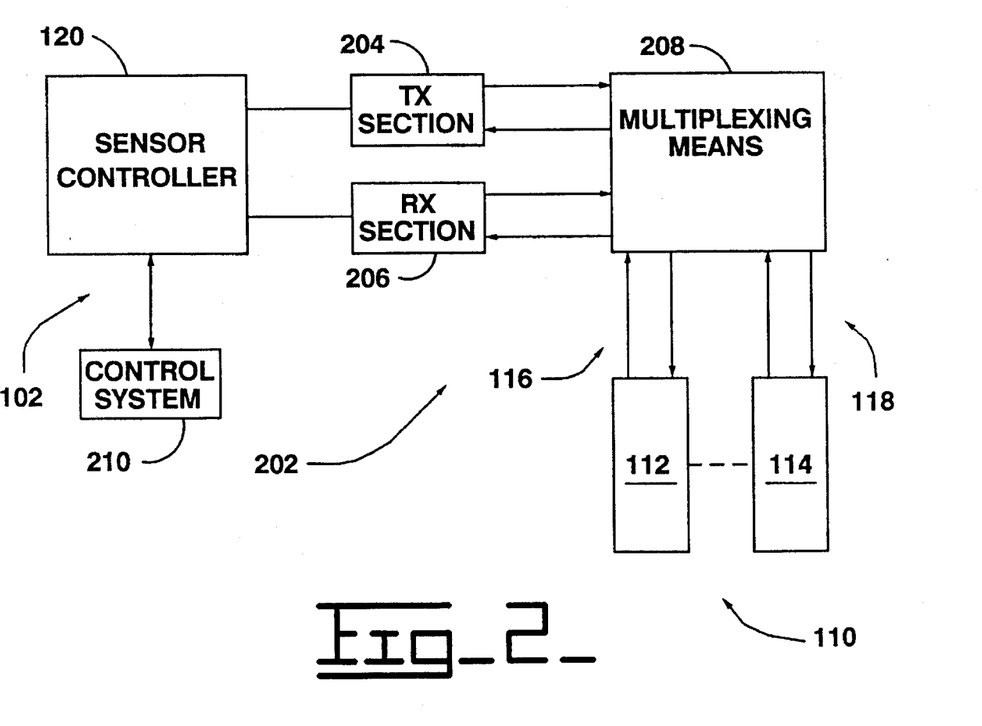
FIG. 2 illustrates a block diagram of a multiplexed RF linear position sensor system with a transmitting section, a receiving section, and a sensor controller, according to an embodiment of the present invention.

In the preferred embodiment, the system 102 includes an RF multiplexed system 202 capable of determining the linear positions of a plurality of hydraulic cylinders. For example, typically on an earth moving vehicle, at least two hydraulic cylinders (not shown) are used to actuate a work implement. The RF multiplexed system repeatedly determines the position of each hydraulic cylinder and the position of the steering cylinder 110. While the other hydraulic cylinders in the system may also have two coaxial resonant cavities, for the purposes discussion it is assumed that the system determines the resonant frequency of both cavities for the steering cylinder only.

With reference to FIG. 2, the RF multiplexed system 202 includes a transmitting section 204, a receiving section 206, and a multiplexing means 208. In the preferred embodiment, the RF system 202 is adapted to provide position signals of the steering cylinder 110 to a control system 210 for the purpose of position feedback control of the vehicle's steering. Additionally, the position of a second steering cylinder may also be determined and delivered to the control system 210. The positions of the other hydraulic cylinders may be provided to other control systems (not shown).

The multiplexed RF system 202 detects the length of the first and second coaxial resonant cavities 112,114 (and the other cylinders) by selectively transmitting RF signals into the cavities 114,116 through the transmitting antennas 130, 134 and receiving reflections of the transmitted RF power through the receiving antennas 132,136.

The first and second coaxial resonant cavities 114,116 and the cavities formed by the other hydraulic cylinders respond similarly to a coaxial transmission line with shorted ends. Each cylinder 110 includes an electrically conductive ring (not shown) to provide electrical connection between the housing 108 and the piston rod 106. In the preferred embodiment, the ring is copper plated.

When excited by a radio frequency (RF) signal, the cavity 114,116 is a highly reactive load except at resonant frequencies. More specifically, if the length ($L_{C1}, L_{C2}$) of the cavity 114,116 is an integer multiple of half the wave length of the signal delivered into the coaxial cavity 114,116, then some RF energy is coupled into the cavity 114,116 exciting a transverse electromagnetic (TEM) field which can be described as the superposition of two waves propagating along the coaxial cavity 114,116. The presence of this time varying electromagnetic field in the cavity 114,116 causes the receiving antenna 132,136 to detect a signal of the same frequency. Each integer multiple is known as a harmonic or resonant frequency.

In one embodiment of the present invention, only the first integer multiple or first harmonic is detected. In a second embodiment, subsequent harmonics are detected.

The resonant frequency of an ideal coaxial cavity is given by the equation:

$$f_{res} = \frac{n}{2} \left( \frac{c}{(E_r)^{1/2}} * \frac{1}{L_C} \right)$$

$$(n = 1, 2, 3 \ldots)$$

where, $C = 3 \times 10^{10}$ cm/s, $f_{res}$ is the excitation frequency, $E_r$ is the relative permittivity of the fluid within a cavity, and $L_C$ is the length of the cavity. The first harmonic corresponds to n=1, the second harmonic corresponds to n=2, etc.

The resonant frequency of the coaxial cavity 114,116 differs from that of the ideal equation owing to deviations in the geometry of the cavity 114,116 and to the effect of the actual coupling structure. However, a one-to-one relationship exists between the actual resonant frequency of the cavity 114,116 and the length of the cavity $L_{C1}, L_{C2}$, such that deviations from the ideal cavity may be accounted for by calibrating each hydraulic cylinder family type.

The transmitting section 204 generates an RF signal having a predetermined frequency varying between preselected minimum and maximum values.

Figure 3:
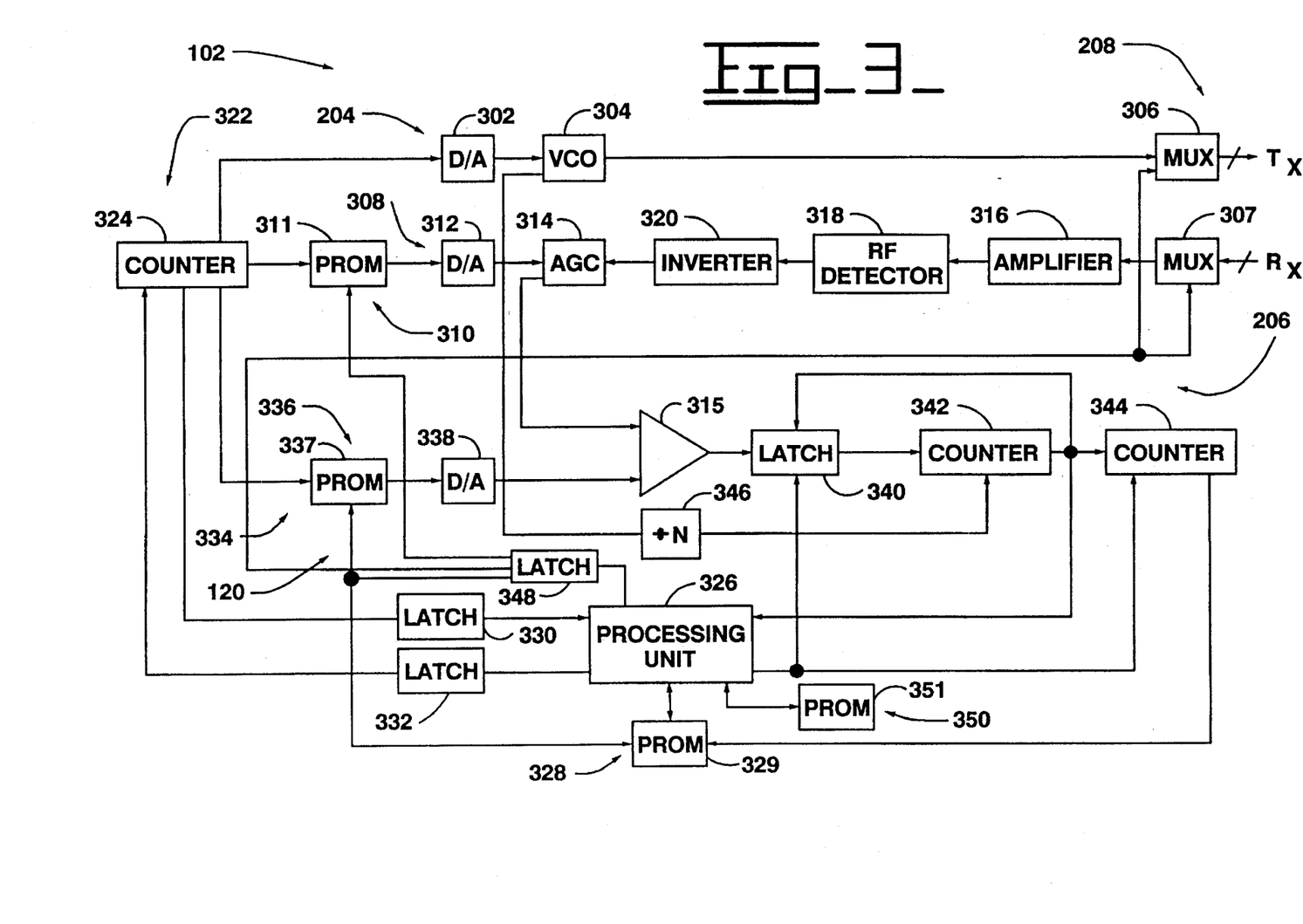
FIG. 3 illustrates an electrical schematic of the transmitting and receiving sections and the sensor controller of an embodiment of the present invention.

Referring to FIG. 3, the transmitting section 204 includes a first digital-to-analog (D/A) 302 and a voltage controlled oscillator (VCO) 304 connected in series. In the preferred embodiment, a D/A from Analog Devices Inc of Norwood, Mass., part no. ADDAC72, is used.

Figure 4:
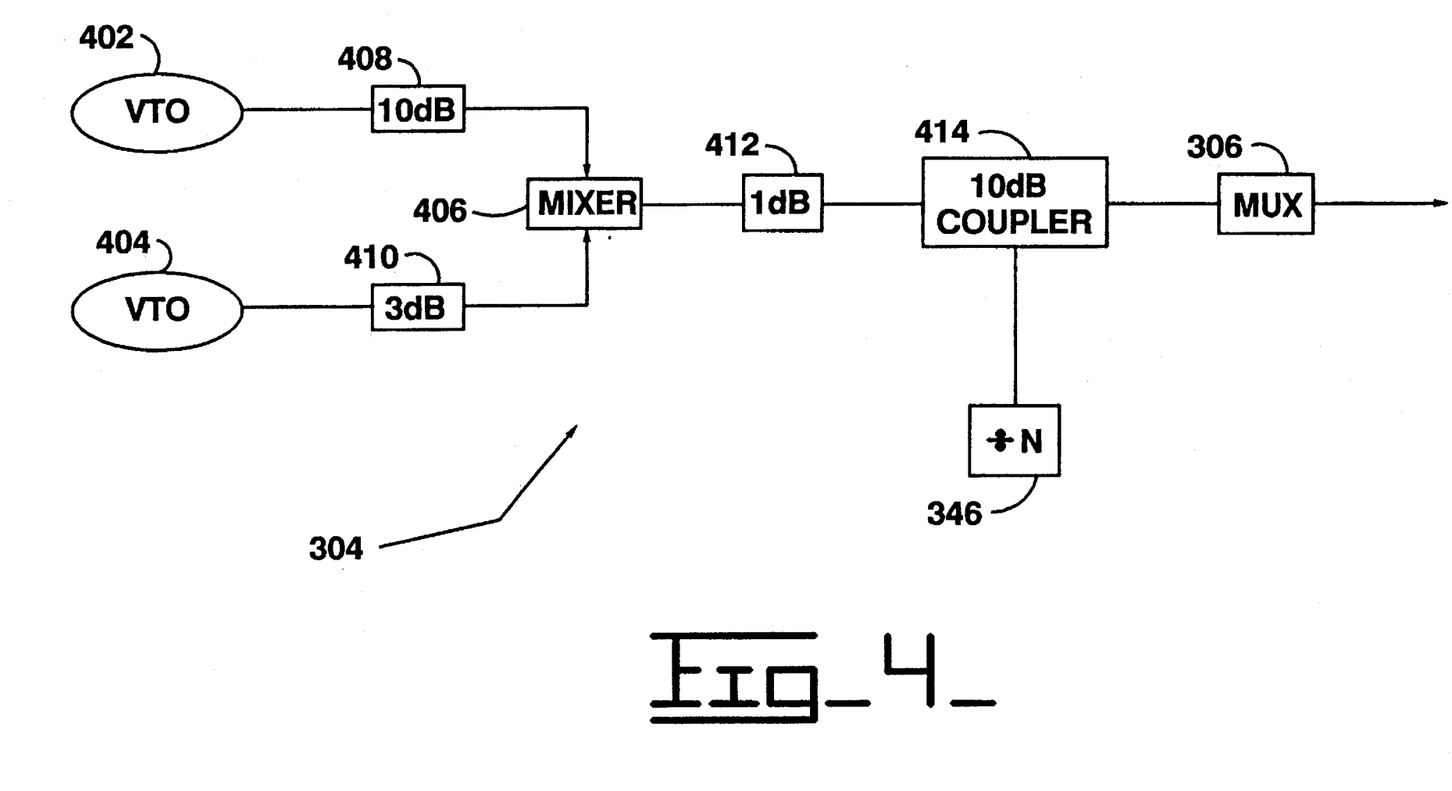
FIG. 4 illustrates a block diagram of the VCO portion of the transmitting section of an embodiment of the present invention.

With reference to FIG. 4, the VCO 304 includes first and second voltage tuned oscillators (VTOs) 402,404. In the preferred embodiment, the first VTO 402 has a frequency range of 4.3 to 5.8 GHz and the second VTO is set at 5.85 GHz. Suitable VTOs are available from Avantek Inc of Hopkins, Minn., part nos. VTO8430 and VTO8490. The first and second VTOs 402,404 feed into a mixer 406 via first and second attenuator pads 408 and 410. In the preferred embodiment, the first and second attenuator pads 408,410 are ten decibel (10 dB) and three decibel (3 dB) attenuator pads, respectively. Suitable pads are available from KDI Corp of New York, N.Y., part nos. PAM-10 and PAM-3. In the preferred embodiment, the mixer 406 is a double balanced mixer having an intermediate frequency (IF) range of DC 0 to 2 GHz. A suitable mixer is available from Watkins-Johnson Co, as part no. WJMSH. A 1 dB attenuator pad 412 (part no. PAM-1) feeds the output of the mixer 406 into a 10 dB coupler 414. A suitable coupler is available from Mini-Circuits as part no. PDC105.

Referring again to FIG. 2, the multiplexing means 208 receives the RF signal and selectively delivers the RF signal into the first or second coaxial resonant cavity 114,116 and receives a first electromagnetic wave signal from within the selected cavity 114,116.

Referring again to FIG. 3, in the preferred embodiment the multiplexing means 208 includes first and second multiplexers 306,307. In the preferred embodiment, the first and second multiplexers 306,307 are devices available from Mini-Circuits of Brooklyn, N.Y., part no. TOSW425. The first multiplexer 306 is connected to the 1 dB coupler 414 of the voltage controlled oscillator 304 as shown in FIGS. 3 and 4.

The receiving section 206 compares the magnitude of the electromagnetic wave signal to a predetermined threshold and responsively produces a first resonant signal. The receiving section 206 includes an automatic gain means 308 for receiving the frequency signal and responsively determining an automatic gain signal. In the preferred embodiment, the automatic gain means 308 includes a memory means 310 and a second D/A converter 312 connected in series. The first memory means 310 includes at least one programmable read only memory (PROM) 311. In the preferred embodiment, the PROM 311 contains a number of tables containing a number of gain factors. The gain factor is dependent upon the frequency of the RF signal being transmitted and the cylinder. A suitable PROM is available from Advanced Micro Devices Inc of Sunnyvale, Calif., part no. AM27S191. The number of PROMs used is a function of the number of hydraulic cylinders and the size of the tables stored in the PROMs. A suitable D/A is available from National Semiconductor Corp of Santa Clara, Calif. as part no. DAC0800.

An automatic gain circuit (AGC) 314 receives the output of the second digital-to-analog converter 312. A suitable AGC is available from Plessey North America Corp of Chicago, Ill. as part no. SL6140. A comparator 315 compares the output of the automatic gain circuit 314 and the threshold value.

An RF amplifier 316 receives the output of the second multiplexer 307 and amplifies the received RF power. In the preferred embodiment, the RF amplifier includes two amplifiers in series (part nos. A26 and A29 available from Watkins-Johnson Co of Palo Alto, Calif.).

Figure 5:
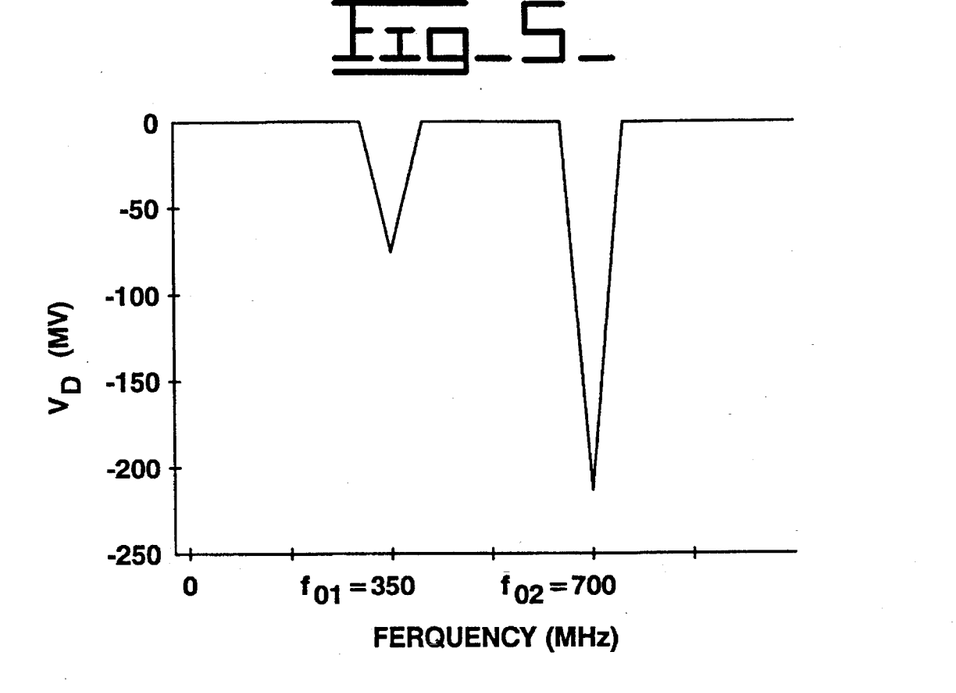
FIG. 5 illustrates a graphical representation of a detected RF signal versus the frequency of the input RF signal.

An RF detector 318 of conventional design generates a negative voltage responsive to the received RF power. The RF detector used is available from Advanced Control Components Inc of Clinton, N.J., as part no. ACSN-2094N. The output of the RF detector 318 for a cylinder having a first harmonic frequency, $f_{o1}$, of 350 MHz and a second harmonic frequency, $f_{o2}$, of 700 MHz second is shown in FIG. 5.

An inverter 320 inverts the output signal of the RF detector 318. One suitable inverter is part no. LM741 available from Motorola Inc of Roselle, Ill. The output of the inverter 320 is fed into the automatic gain circuit 314.

The sensor controller 120 receives the resonant signal and responsively determines the linear extension of the hydraulic cylinders 104 as a function of the frequency of the transmitted RF signal. The sensor controller 120 includes counting means 322 for generating a frequency signal having a predetermined magnitude which varies between minimum and-maximum values. In the preferred embodiment, the counting means 322 includes a 16 bit digital counter 324. A suitable counter is available from Motorola Inc as part no. 74HC191.

Figure 6:
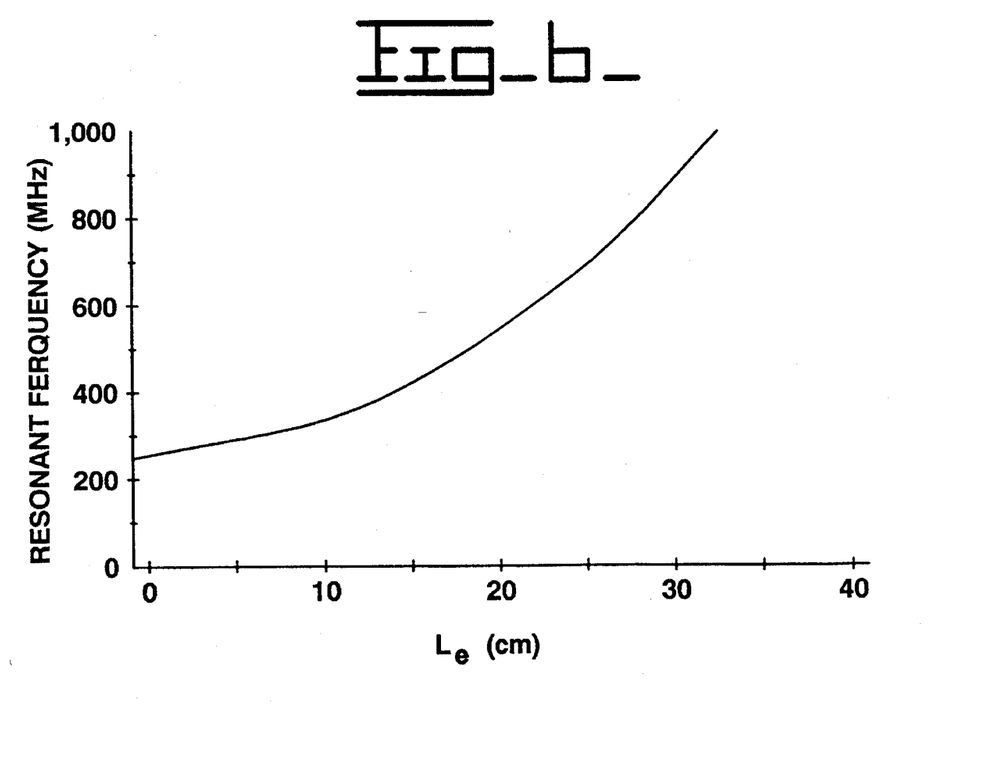
FIG. 6 illustrates a graphical representation of the displacement of the piston rod versus the frequency of the input RF signal.

The sensor controller 120 further includes a processing unit 326 and a second memory means 328. In the preferred embodiment, the processing unit 326 is based on a MC68HC11 microprocessor available from Motorola Inc. The processing unit 326 is connected to the first digital counter 324 by first and second latches 330,332. Suitable latches are tri-state octal latches available from Motorola Inc, part no. 74HC573. In the preferred embodiment, the second memory means 328 includes a second PROM 329. A suitable PROM 329 is available from Advanced Micro Devices as part no. AM27C128. In the preferred embodiment, the second PROM 329 stores a number of lookup tables (one for each cylinder). Each lookup table is similar to the graph shown in FIG. 6. The graph of FIG. 6, illustrates the proportional relationship between the resonant frequency of the cylinder and position of the piston rod 106. The resonant frequency for a given extension is dependent upon the geometry of the cylinder.

The sensor controller 120 further includes means 334 for determining the threshold values. The threshold value determining means 334 includes a third memory means 336 and a third digital-to-analog converter 338 (part no. DAC0800) connected in series. In preferred embodiment, the third memory means 336 includes a third PROM 337 (part no. AM27128). In the preferred embodiment, the third PROM 337 contains number of tables storing the threshold values for each cylinder.

A third latch 340 (part no. 74HC573) connects the output of the comparator to a second digital counter 342. A third digital counter 344 is connected to the second digital counter 342. The second digital counter 342 is connected to the voltage controlled oscillator 304 through a prescaler or divider 346. In the preferred embodiment, a 256 divider from Plessey North America, part no. SP4740 is used. The output of the second digital counter 342 is connected to the processing unit 326. The third digital counter 344 is connected to the processing unit 326 and the first memory means 328.

When the output of the AGC 314 exceeds the threshold value from the third PROM 337, the third latch enables the second digital counter 342. The second digital counter enables the third digital counter 344. The second digital counter 342 counts 128 pulses from the output of the divider 346 and the third digital counter 344 counts the time required for 128 pulses to occur. In the preferred embodiment, the third digital counter 344 uses a 16 MHz clock input.

A fourth latch 348 connects the processing unit 326 with the first and third PROMs 311,337 and the first and second multiplexers 306,307.

The sensor controller 120 further includes a fourth memory means 350 used for temporary storage of data. In the preferred embodiment, the fourth memory means 350 includes a fourth PROM 351 (part no. AM27C128).

FIGS. 7 to 10 are flow diagrams illustrating a computer software program for implementing the preferred embodiment of the present invention. The program depicted in these flowcharts is particularly well adapted for use with the microcomputer and associated components described above, although any suitable microcomputer may be utilized in practicing an embodiment of the present invention. These flowcharts constitute a complete and workable design of the preferred software program, and have been reduced to practice on the MC68HC11 microcomputer system. The software program may be readily coded from these detailed flow diagrams using the instruction set associated with this system, or may be coded with the instructions of any other suitable conventional microcomputer. The process of writing software code from flow diagrams such as these is a mere mechanical step for one skilled in the art.

Figure 7:
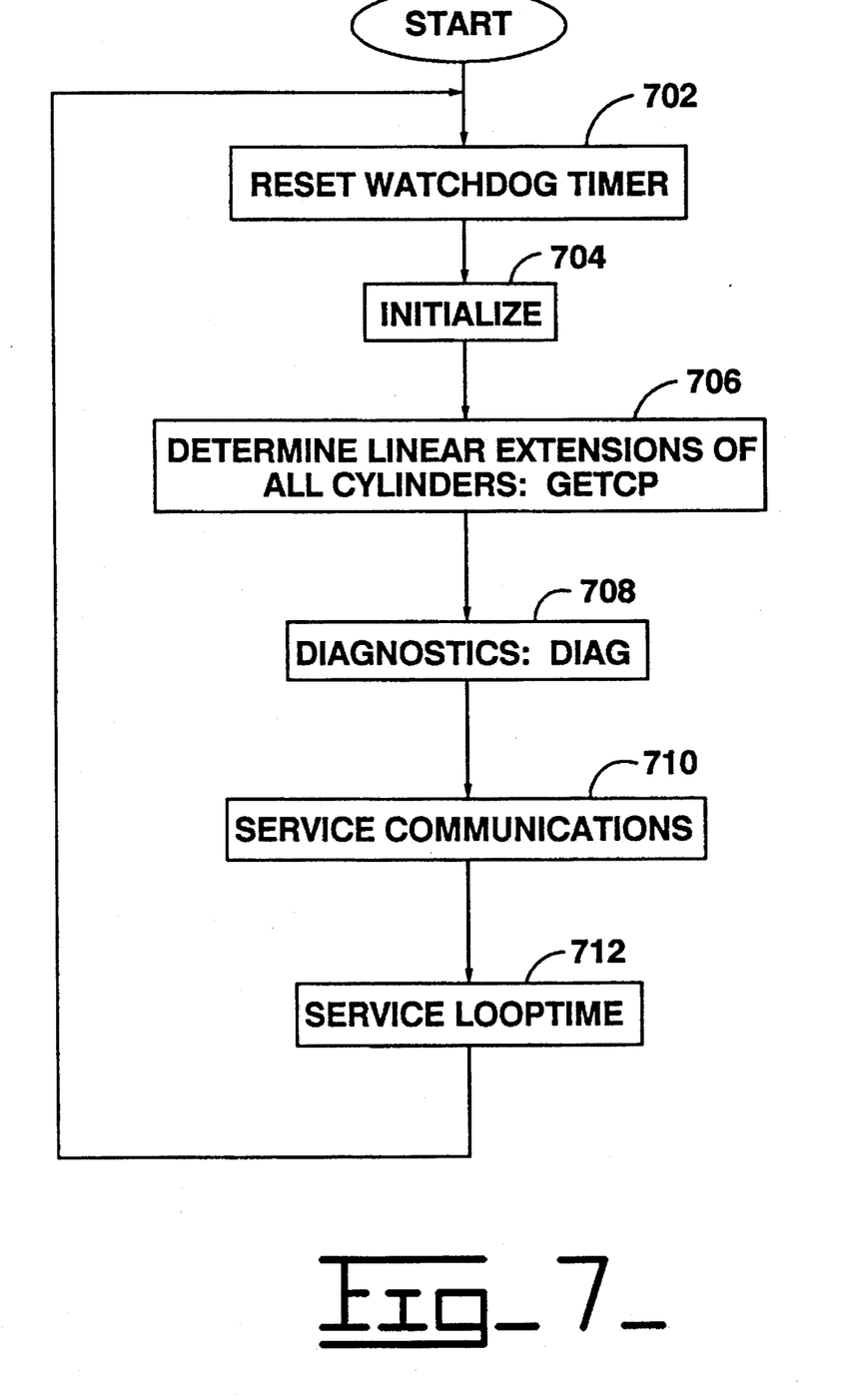
FIG. 7 is a flow diagram of the main control loop of an embodiment of the present invention.

With reference to FIG. 7, the main control loop of the software program is described. In control block 702, a timer or watchdog timer is reset. The watchdog timer is of conventional design and is used to detect if the microprocessor has become disabled. The use of a watchdog timer is well known in the art and is therefore not further discussed.

In control block 704, the system 102 is initialized. The initialization routine includes initializing the hardware, as well as constants and other software parameters.

In control block 706, the subroutine GETCP is called. As explained below, the GETCP subroutine determines the position of the piston and piston rod 104,106 of the steering cylinder 110 and the position or extension of the other hydraulic cylinders. The subroutine GETCP stores the positions in the second PROM 329.

In control block 708, the diagnostic subroutine DIAG is called.

In control block 710, the systems communications are serviced. This includes reading the positions from the second PROM 329, calculating a checksum (CHKSUM) for transmission purposes and transmitting the data outside the system to the appropriate control system.

In the preferred embodiment, cylinder positions are needed every 15 ms. Therefore, the time taken for control blocks 702–710 to be performed is determined and subtracted from 15 ms. In control block 712, the program then delays or waits for the remaining time to lapse. Control then returns to control block 702.

Figure 8:
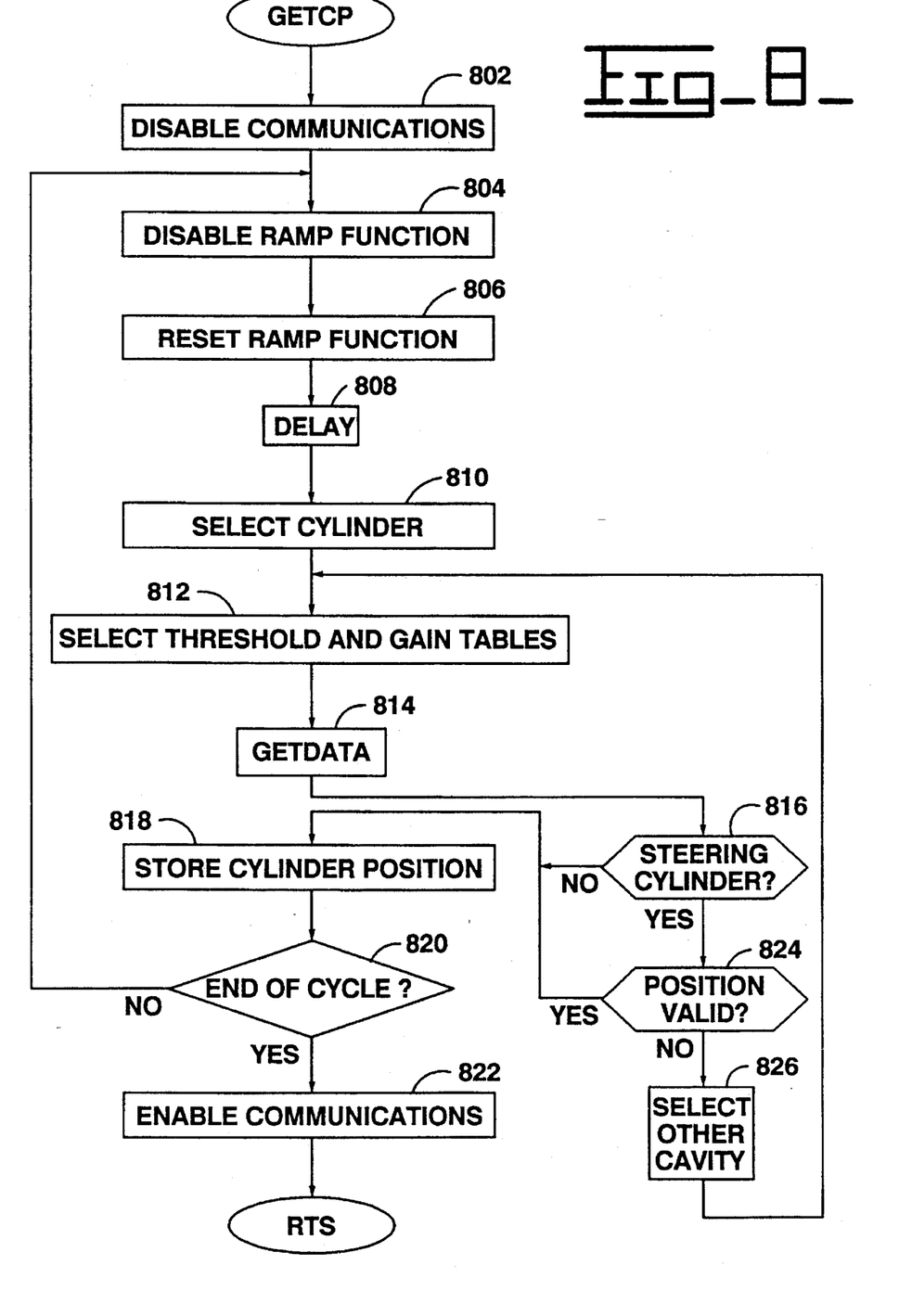
FIG. 8 is a flow diagram of the GETCP subroutine as called by the main control loop of FIG. 7.

With reference to FIG. 8, the operation of subroutine GETCP is described. In the preferred embodiment, the processing unit 326 normally handles communications first. During the subroutine GETCP, however, this is undesirable. In control block 802, communication interrupts are therefore disabled.

In the preferred embodiment, the value in the first digital counter 324 is used to control the frequency of the output of the VCO 304. The value of the counter is inversely proportional to the frequency of the VCO output signal. In order to determine the extension of the cylinder, the first counter 324 is first set to a high value and linearly decreased until a maximum frequency is reached or the extension is determined.

In control block 804, the ramp function is disabled. This ensures that the VCO 304 is turned off so that a random or undesired signal is not sent to the multiplexing means 108 through the VCO 304.

In control block 806, the ramp function is reset. This is done by resetting the first digital counter 324. In one embodiment, this is done by setting the counter 324 to a maximum value (for example, $FFFF) through latch 332.

In another embodiment, the first counter 324 is set to a value dependent upon the last known position of the cylinder. For example, if the last known position of the cylinder was 10 cm with a corresponding frequency of 300 MHz, the counter 324 may be set to a value corresponding to a frequency of less than 300 MHz.

In control block 808, the program waits for a fixed time delay of 25 microseconds.

In control block 810, the next cylinder for which the position is to be determined is selected. The processing unit 326 sends a signal to the multiplexing means 208 through the fourth latch 348. The signal controls the first and second multiplexers 306,307 to transmit and receive to/from the corresponding cylinder. If the cylinder selected is the steering cylinder 110, then the multiplexing means 208 transmits and receives RF signals to/from one of the resonant cavities 114,116.

In control block 812, the threshold and gain tables are selected. The threshold and gain tables are contained in the third and first memory means 336,310, respectively.

In control block 814, the subroutine GETDATA is called. GETDATA determines the position of the cylinder (see below).

In control block 816, if the selected cylinder is the steering cylinder 110, then control goes to decision block 824. Otherwise, control proceeds to control block 818.

In control block 818, the position is stored in the second PROM 329.

In decision block 824, if the first determined location is valid, then control proceeds to control lock 818. If the determined location is invalid, then the multiplexing means 208 is signalled to transmit and receive from the other cavity 114,116. (control block 826).

When attempting to determine the position of the steering cylinder 110, the system first determines location as a function of the resonant frequency of one of the first or second resonant cavities 114,116, (see subroutine GETDATA). If the determined location is on the other side of the cylinder 110 from the transmitting and receiving antennas 130,132,134,136 than the first location is valid. The determined location is than stored as the steering cylinder's position (control block 818).

If the first location is on the same side of the cylinder 110 as the transmitting and receiving antennas 130,132,134,136 than the first location is deemed invalid. If the first location is invalid, the resonant frequency of the other coaxial cavity is found and a second location is determined. The second location is then stored as the steering cylinder's position.

In the preferred embodiment, the steering cylinder 110 is calibrated to determine the range of valid data for both cavities 114,116. Data is taken from both cavities 114,116 over the full range of the cylinder 110.

The linear movement of the cylinder 110 is then divided into valid and invalid ranges for each set of antennas 130,132,134,136. For example, the valid range for the first transmitting and receiving antennas 130,132 would begin at approximately the midpoint of the cylinder 100 and end at the opposite end of the cylinder. The valid range for the second transmitting and receiving antennas 134,136 would begin at approximately the midpoint of the cylinder 110 and end at the left end of the cylinder 110.

In the preferred embodiment, the valid ranges overlap in the middle of the cylinder 110 to allow for lag time in the electronics. Preferably, the overlap portion is small in relation to the length of the cylinder. For example, in a steering cylinder with a total length, $L_T$, of 17 cm, each valid range is approximately 8.7 cm in length, leaving an overlap area of overlap of approximately 0.4 cm.

Each valid range of cylinder positions has a corresponding resonant frequency range.

In the preferred embodiment, the valid range data is stored in a lookup table (.see below). A constant which is outside the valid range is used to represent invalid data. For example, if the data stored in the lookup table varies between −950 and 950, then a constant having an absolute value greater than 950 is stored to represent invalid data.

In control block 820, if the end of the cycle has been reached, that is, the position or extension of all cylinders has been determined, control goes to control,block 822.

If the end of the cycle has not been reached control returns to control block 804.

In control block 822, communication interrupts are enabled. Control then returns to the MAIN control loop.

Figure 9A:
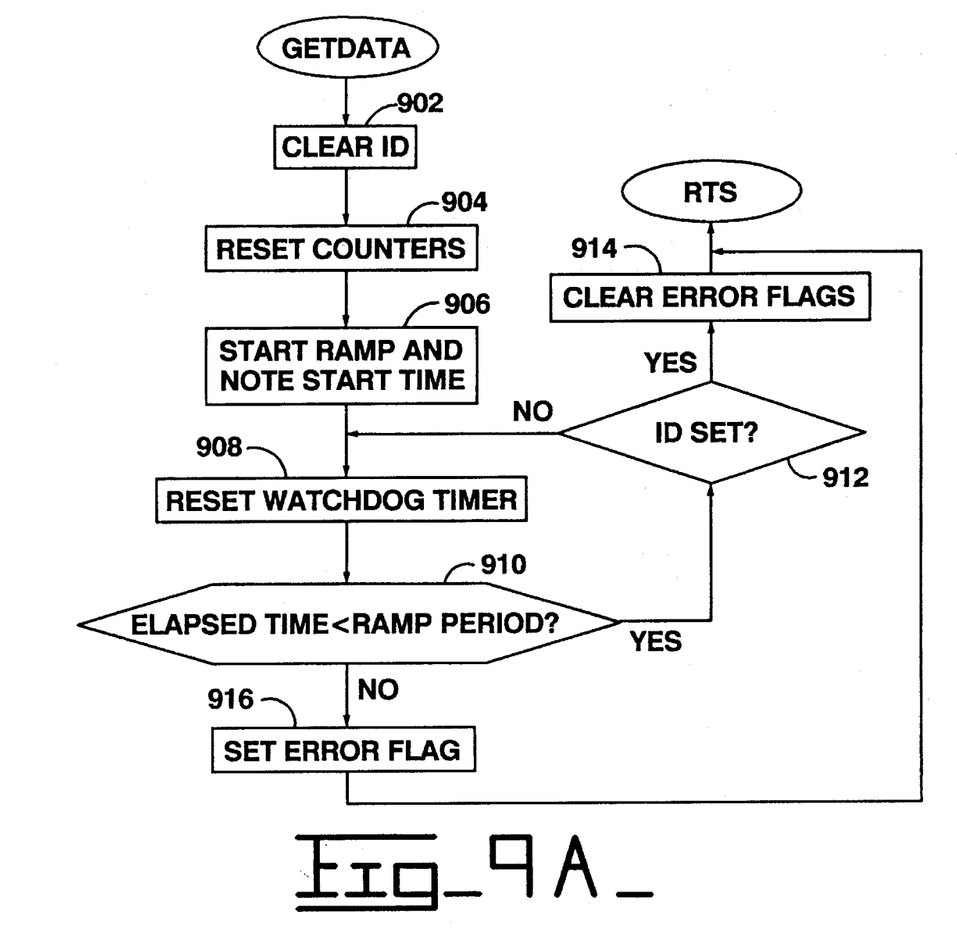
FIG. 9A is a flow diagram of the GETDATA subroutine as called by the subroutine GETCP of FIG. 8, according to one embodiment of the present invention.

With reference to FIG. 9A, one embodiment of subroutine GETDATA is described. In the preferred embodiment, a hardware interrupt line (ID) is set when the linear position of the cylinder has been determined. Therefore at the start of GETDATA, the interrupt line is reset (control block 902). In control block 904, the second and third digital counters 342,344 are reset (to zero). In control block 906, the ramp function is started and a timer is started. That is, the first digital counter is linearly decreased resulting in an increasing frequency RF signal being generated.

In control blocks 908–912 a loop is executed until the position of the cylinder has been determined. In control block 908, the watch dog timer is reset. In control block 910, the elapsed time is compared with a maximum ramp time. If the elapsed time is less than the maximum ramp time than control goes to control block 912. In control block 912, if the hardware interrupt line ID is set, then the position has been determined (see below) and control proceeds to control block 914. Otherwise control returns to control block 908.

In control block 914, the error flags are cleared and control returns to subroutine GETCP. In control block 916, an error flag is set indicating that no position was determined and control returns to subroutine GETCP.

In a second embodiment of subroutine GETDATA, the system 102 is adapted to determine two subsequent resonant frequencies of each hydraulic cylinder or cavity. The first digital counter 324 ramps up until a resonant frequency is found. The first digital counter 324 is then locked at the current value. As described above, the second and third digital counters 342,344 are then enabled. The first digital counter counts 128 pulses from the output of the divider 346.and the third digital counter 344 is used to time the period of the 128 pulses. After 128 pulses the value of the third digital counter 344 is stored in the second PROM 329.

The first digital counter 324 is then started again from the current value and the next resonant frequency is found. The two resonant frequencies are then subtracted and the linear position of the current hydraulic cylinder is determined as a function of the difference.

Figure 9B:
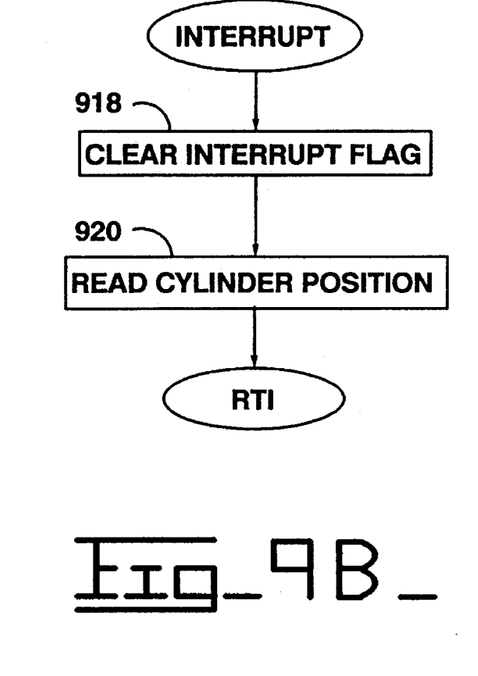
FIG. 9B is a flow diagram if an interrupt routine, according to an embodiment of the present invention.

With reference to FIG. 9B, the software interrupt routine is described. When the interrupt line ID is set, the routine is run. First, in control block 918, the software clears the software interrupt flag. Then the cylinder position is read. This involves reading the value of cylinder extension from the second PROM 324. In the preferred embodiment, the value in the third digital counter 344 is an address of a memory location within the second PROM 324. The value of the third digital counter 344 is proportional to the resonant frequency. The counter value is then plugged into the corresponding lookup table in the second PROM 329 to determine the cylinder extension.

Figure 10:
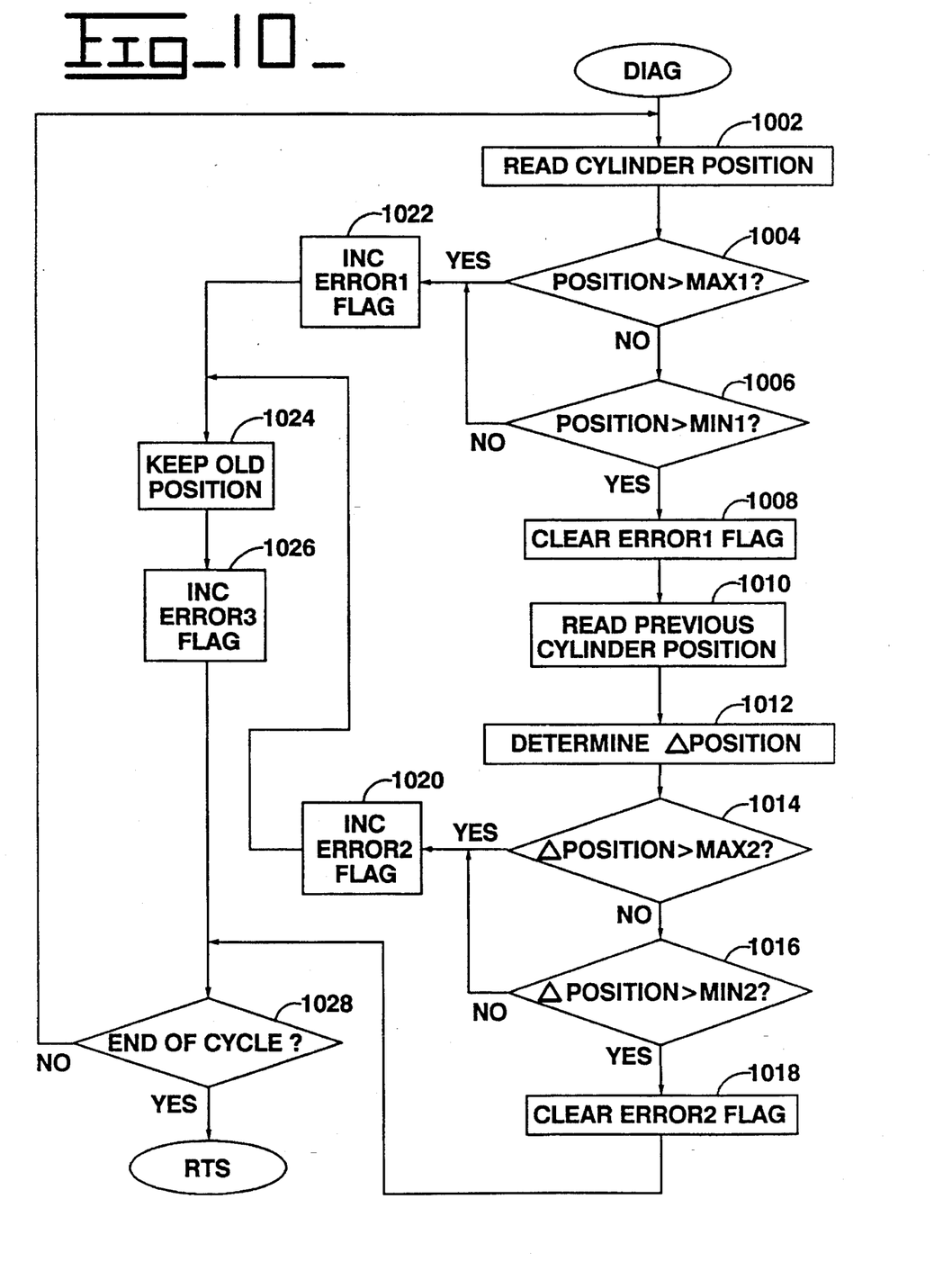
FIG. 10 is a flow diagram of the DIAG subroutine as called by the main control loop of FIG. 7.

With reference to FIG. 10, the main control loop calls a diagnostic subroutine: DIAG. DIAG keeps track of the total number of errors (ERROR1) and looks for consecutive errors, both in position (ERROR3) and change in position or velocity (ERROR2).

In control block 1002, the POSITION or linear extension of a cylinder is read from the second PROM 329.

In control block 1004 POSITION is compared to a software set maximum position (MAX1). If POSITION>MAX1 then control goes to control block 1022. If POSITION≦MAX1 then control goes to control block 1006.

In control block 1006 POSITION is compared to a software set minimum position (MIN1). If POSITION>MIN1 then control goes to control block 1022. If POSITION≦MIN1 then control goes to control block 1008. Since POSITION is within the acceptable boundaries set by MAX1 and MIN1, the ERROR1 FLAG is cleared in control block 1008.

In control block 1010, the previous cylinder position is read from the second PROM 329. In control block 1012 the previous cylinder position is subtracted from the current POSITION to determine a ΔPOSITION.

In control block 1014 ΔPOSITION is compared to a software set maximum position (MAX2). If ΔPOSITION>MAX2 then control goes to control block 1020. If ΔPOSITION≦MAX2 then control goes to control block 1016.

In control block 1016, POSITION is compared to a software set minimum position (MIN2). If ΔPOSITION>MIN2 then control goes to control block 1020. If ΔPOSITION≦MIN2 then control goes to control block 1018. Since ΔPOSITION is within the acceptable boundaries set by MAX2 and MIN2, the ERROR2 FLAG is cleared in control block 1008.

In control blocks 1020,1022 the ERROR2 and ERROR1 flags are incremented, respectively. The ERROR1 and ERROR2 flags keep track of the number of consecutive position and velocity errors, respectively.

In control block 1024, since the new position is out of acceptable bounds (position or velocity) the previous position is stored as the current position. In control block 1026, the ERROR3 flag is incremented. ERROR3 keeps track of the total number of errors, position or velocity.

In control clock 1028, if all the cylinder positions have been checked then control returns to the main control loop. Otherwise, control returns to control block 1002 and the next cylinder's position is checked.

Industrial Applicability

With reference to the drawings and in operation, the apparatus 102 is adapted to determine the linear position of a steering cylinder 110. As discussed above, a RF multiplexing system 202 is used. The RF multiplexing system 202 is adapted to determine the resonant frequency of the first and second resonant cavities 114,116 of the steering cylinder 110 and the resonant frequencies of other hydraulic cylinders.

The system 102 cycles through main control loop every 15 ms and determines the linear position of each hydraulic cylinder. If the system 102 is attempting to determine the position of the steering cylinder 110, the resonant frequency of one of the resonant cavities 114,116 is first determined. The resonant frequency is then converted into a piston location. If the piston location is valid then the location is stored as the piston's position. If the piston location is invalid, then the resonant frequency of the other cavity is determined. The resonant frequency of the other cavity is used to determine the piston's position.

Then the system 102 supplies the position of the steering cylinder 110 to the control system 110 and the positions of the other hydraulic cylinders to other control systems (not shown) every 15 ms. The external control systems may use this information for display purposes or in a control system which is adapted to control the movement of the hydraulic cylinders.

Other aspects, objects, and advantages of the present invention can be obtained from a study of the drawings, the disclosure, and the appended claims.

We claim:

1. An apparatus for detecting a position of a piston and a piston rod being movable within a housing, said piston, piston rod and housing defining first and second coaxial resonant cavities, the first and second coaxial resonant cavities beings on opposite sides of the piston, comprising:

means for determining the resonant frequency of said first coaxial cavity and responsively producing a first resonant frequency signal;

means for determining the resonant frequency of said second coaxial cavity and responsively producing a second resonant frequency signal; and means for receiving said first and second resonant frequency signals and determining a first position of said piston and piston rod as a function of said first frequency signal, determining if said first determined position is valid, and for a second position of said piston and piston rod as a function of said second frequency signal is said first determined position is invalid.

2. An apparatus, as set forth in claim 1, wherein said first coaxial cavity resonant frequency determining means includes:

means for producing a first electromagnetically radiated signal and delivering said first electromagnetically radiated signal into said first resonant cavity, said electromagnetically radiated signal having a frequency varying between predetermined minimum and maximum values; and means for sensing an electromagnetic wave signal within said first coaxial cavity, comparing said first electromagnetic wave signal with a first predetermined threshold, and producing a first frequency signal in response to the magnitude of said first electromagnetically radiated signal being greater than said first predetermined threshold.

3. An apparatus, as set forth in claim 1, wherein said second coaxial cavity resonant frequency determining means includes:

means for producing a second electromagnetically radiated signal and delivering said second electromagnetically radiated signal into said second resonant cavity, said electromagnetically radiated signal having a frequency varying between predetermined minimum and maximum values; and means for sensing an electromagnetic wave signal within said second coaxial cavity, comparing said second electromagnetic wave signal with a second predetermined threshold, and producing a second frequency signal in response to the magnitude of said second electromagnetically radiated signal being greater than said second predetermined threshold.

4. An apparatus, as set forth in claim 1, wherein said piston and piston rod are movable between first and second end positions, and said predetermined setpoint corresponds to the midpoint between said first and second end positions, and wherein said position is set to said first location if said first and second locations are between said predetermined setpoint and said first end position and to said second condition if said first and second locations are between said predetermined setpoint and said second end position.

5. An apparatus for detecting a position of a piston and a piston rod being movable within a housing, said piston, piston rod and housing defining first and second coaxial resonant cavities, the first and second coaxial resonant cavities being on opposite sides of the piston, comprising:

means for producing a first electromagnetically radiated signal and delivering said first electromagnetically radiated signal into said first resonant cavity, said electromagnetically radiated signal having a frequency varying between predetermined minimum and maximum values;

means for sensing an electromagnetic wave signal within said first coaxial cavity, comparing said first electromagnetic wave signal with a first predetermined threshold, and producing a first frequency signal in response to the magnitude of said first electromagnetically radiated signal being greater than said first predetermined threshold;

means for producing a second electromagnetically radiated signal and delivering said second electromagnetically radiated signal into said second resonant cavity, said electromagnetically radiated signal having a frequency varying between predetermined minimum and maximum values;

means for sensing an electromagnetic wave signal within said second coaxial cavity, comparing said second electromagnetic wave signal with a second predetermined threshold, and producing a second frequency signal in response to the magnitude of said second electromagnetically radiated signal being greater than said second predetermined threshold; and means for receiving said first and second frequency signals and responsively determining a first position of said piston and piston rod as a function of said first frequency signal, determining if said first determined position is valid, and determining a second position of said piston and piston rod as a function of said second frequency signal if said first determined position is valid.

6. An apparatus, as set forth in claim 5, wherein said location determining means includes means for determining a first location of said piston and piston rod as a function of said first frequency signal, determining a second location of said piston and piston rod as a function of said second frequency signal, comparing said first and second locations with a predetermined setpoint, and responsively setting said determined position to one of said first and second locations.

7. An apparatus, as set forth in claim 6, wherein said setpoint corresponds to the midpoint of said hydraulic cylinder.

8. An apparatus, as set forth in claim 5, wherein said first and second electromagnetically radiated signal comparing means includes means for detecting the peak amplitude of said first and second electromagnetic wave signals, respectively, and responsively producing first and second peak signals.

9. An apparatus for detecting a position of a piston and a piston rod being movable within a housing, said piston, piston rod and housing defining first and second coaxial resonant cavities, comprising:

means for determining the resonant frequency of said first coaxial cavity and responsively producing a first resonant frequency signal;

means for determining the resonant frequency of said second coaxial cavity and responsively producing a second resonant frequency signal; and means for receiving said first and second resonant frequency signals and responsively determining a first position of said piston and piston rod as a function of said first frequency signal, determining if said first determined position is valid, and determining a second position of said piston and piston rod as a function of said second frequency signal if said first determined position is invalid.

10. A method for detecting a position of a piston and a piston rod being movable within a housing, said piston, piston rod, and housing defining first and second coaxial resonant cavities, including the steps of:

determining the resonant frequency of one of said first and second coaxial resonant cavities and responsively producing a first resonant frequency signal;

receiving said first resonant frequency signal and responsively determining a first location of said piston;

determining if said first determined location is valid; and determining the resonant frequency of the other of said first and second coaxial resonant cavities and responsively determining a second location of said piston, if said first determined location is not valid.

11. A method, as set forth in claim 10, wherein said validity determination step includes the step of comparing said first determined location to a predetermined setpoint.

12. A method, as set forth in claim 11, wherein said setpoint corresponds to substantially the midpoint of the piston's movement.

13. A method, as set forth in claim 10, wherein said first determined location is valid if said first resonant frequency signal is within a preset range.

14. A method, as set forth in claim 13, wherein said first location determining step uses a lookup table.

15. A method, as set forth in claim 14, wherein said lookup table returns a value within a predetermined range if said first resonant frequency signal is within said preset range and a constant which is outside said predetermined range if said first resonant frequency signal is not within said preset range.

* * * * *